Jan. 11, 1966 J. KÄGI 3,228,463
HEAT EXCHANGER
Filed June 4, 1962 2 Sheets-Sheet 1

Inventor:
JAKOB KÄGI
K. A. Mayr
By Attorney

United States Patent Office 3,228,463
Patented Jan. 11, 1966

3,228,463
HEAT EXCHANGER
Jakob Kägi, Winterthur, Switzerland, assignor to Sulzer Frères, S.A., Winterthur, Switzerland, a corporation of Switzerland
Filed June 4, 1962, Ser. No. 199,809
Claims priority, application Switzerland, June 12, 1963, 6,796/61
4 Claims. (Cl. 165—158)

The present invention relates to a heat exchanger wherein heat is transferred from one fluid to a second fluid, particularly to a heat exchanger for nuclear reactor plants whereby one of the heat exchanging fluids is a gas serving as coolant for the nuclear reactor and cooled in the heat exchanger. The heat exchanger with which the invention is concerned is of the type comprising a plurality of tubes enclosed in a cylindrical vessel, at least one of the ends of each tube being connected to a tube plate placed in the vicinity of the lateral wall of the cylindrical vessel.

Heat exchangers of nuclear reactor plants wherein heat is transferred from a reactor cooling fluid, which is usually in the gas state, to an operating medium, which is usually water or steam producing mechanical power in a turbine, must offer a minimum of resistance to the flow of the reactor cooling fluid so that there is a minimum of pressure lost while the cooling fluid passes through the heat exchanger and the pumps for circulating the cooling fluid and the power required for operating the pumps are as small as possible. Such heat exchangers are therefore preferably incased in a cylindrical vessel whereby the heating fluid which is the reactor coolant flows along a straight path from an inlet in one end plate to an outlet in the opposite end plate. The heat receiving fluid is conducted through a plurality of tubes forming a unit which is placed inside the cylindrical vessel. The inlet ends of the tubes are combined in an inlet conduit which extends through the lateral wall of the vessel. The same is done with the outlet ends of the tubes.

It has been proposed to connect the inlet ends of the tubes to a tube plate which is placed inside of and covers a suitable aperture in the lateral wall of the cylindrical vessel. The tube plate is made fast on the vessel by bolts or studs. This arrangement is difficult to assemble and to provide access to a packing between the tube plate and the vessel the tubes must be removed from the vessel.

It is an object of the present invention to provide a heat exchanger structure wherein tubes conducting a first heat exchanging fluid are placed within a cylindrical vessel conducting a second heat exchanging fluid, and means are provided for conducting the first heat exchanging fluid to and from said tubes through the lateral wall of the cylindrical vessel which means are so constructed and arranged as to facilitate assembly of the heat exchanger and to provide convenient access to all joints and seals or packings required for positively separating the two fluids from each other as well as from the outside of the heat exchanger.

The structure according to the invention avoids the disadvantages described above of conventional structures by providing a connecting element extending through the lateral wall of the cylindrical vessel and being tightly connected thereto, a tube plate to which the tubes inside the vessel are tightly connected and which is tightly connected to said connecting element, and a conduit connected to said connecting element for conducting one of the heat exchanging fluids to or from the tubes.

The novel features which are considered characteristic of the invention are set forth with particularity in the appended claims. The invention itself, however, and additional objects and advantages thereof will best be understood from the following description of embodiments thereof when read in connection with the accompanying drawing, wherein:

Figure 1:
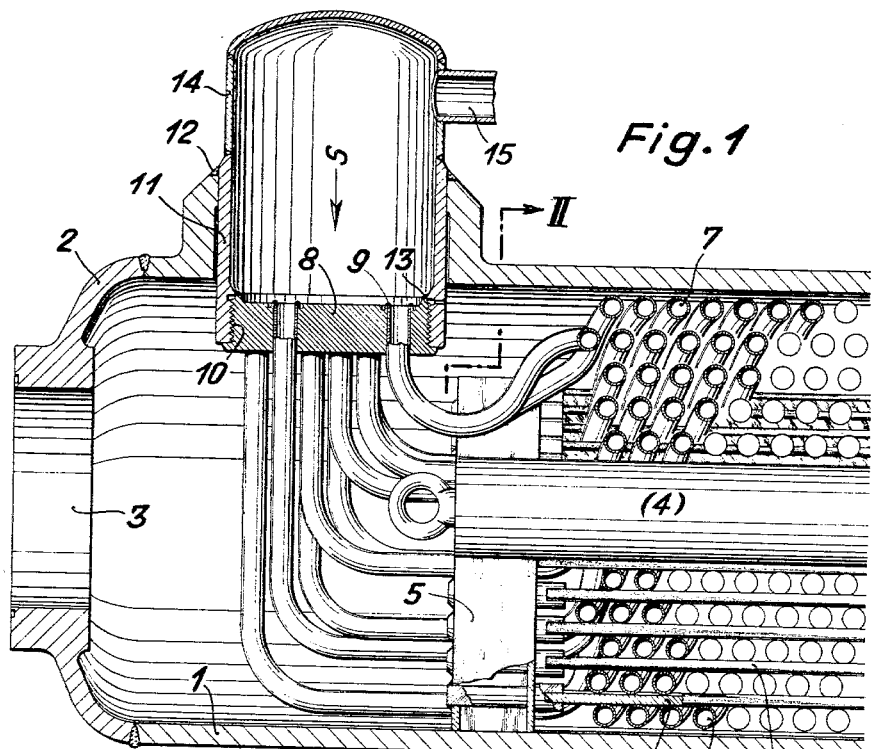
FIG. 1 is a longitudinal sectional view of an end portion of a heat exchanger according to the invention.
Figure 2:
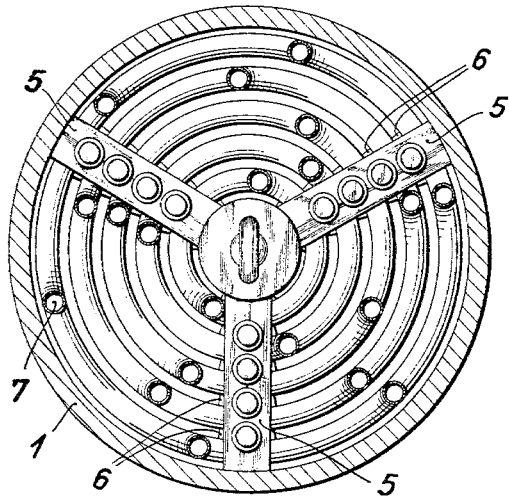
FIG. 2 is a cross-sectional view of the heat exchanger shown in FIG. 1, taken along line II—II of FIG. 1.
Figure 3:
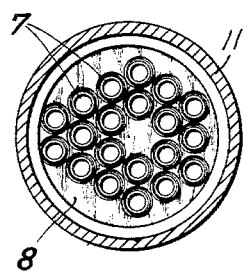
FIG. 3 is a top view of a tube plate forming part of the heat exchanger and seen in the direction of the arrow S of FIG. 1.

Referring more particularly to the drawing, numeral 1 designates a cylindrical vessel of which only one end portion is shown. The other end portion of the vessel is like the one shown. Each end of the vessel is provided with an end plate 2 having an inlet or outlet aperture 3 for supplying a heating fluid to and removing the fluid from the vessel 1. The heating fluid may be a gas used for cooling a nuclear reactor. A framework comprising a tube 4 placed coaxially of the vessel 1, boxlike supports 5 extending radially from the tube 4, and rods 6 placed parallel with the tube 4 is placed within the vessel 1 for coaxially supporting a plurality of cylindrical tube coils 7. The ends of the tubes forming the coils 7 extend into apertures in a tube sheet 8 and are tightly connected thereto by welds 9. The pitch angles of the tube coils forming the individual cylinders are all alike. Depending on the diameter of the tube cylinder, a smaller or greater number of tubes may be used in each tube cylinder, forming a multiple parallel winding, so that all tubes are substantially of equal length and are equally spaced in each tube cylinder. Since the lengths of the individual tubes 7 between the tube sheets 8 are substantially equal, the fluid passing through the tubes is substantially equally distributed in the tubes so that the fluid passes through the tubes at substantially equal rates of flow and the fluid is substantially equally heated in all of the tubes.

The tube sheet 8 has a threaded circumferential surface 10 onto which the lower portion of an internally threaded hollow connecting element 11 is screwed. The element 11 is connected to a suitably shaped portion of the cylinder 1 by means of a weld seam 12. A sealing weld seam 13 is applied between the tube sheet 8 and the element 11. The top of the hollow element 11 is closed by a dome-shaped closure member 14 to which a conduit 15 is connected for conducting the fluid passing through the tubes 7.

For assembling the heat exchanger the tubes 7 are mounted in the support system 4, 5, 6 and the ends of the tubes are connected to the tube sheets 8 to form a self-contained unit. This unit is inserted through one end of the vessel 1 before the end plate 2 is applied and the tube sheets 8 are placed opposite the apertures in the vessel 1 provided for receiving the elements 11. The latter are thereupon inserted and screwed onto the tube sheets 8 whereafter the weld seams 12 and 13 are applied. Finally, the elements 14 and 15 are connected by suitable welds. It will be noted that the central axes of the circular tube sheets are normal to the longitudinal axis of the vessel 1 and the tube sheets face the inside of the cylindrical vessel and are spaced therefrom.

If there is a leakage in one of the welds, permitting interchange of the heating fluid and the heated fluid passing through the heat exchanger, and for periodic control of the respective weld seams, the part 14 is separated from the element 11 whereby all weld seams separating one fluid from the other, i.e. the weld seams 9 and 13, are made accessible and can be conveniently repaired. Thereupon the closure member 14 is welded again to the hollow element 11.

Figure 4:
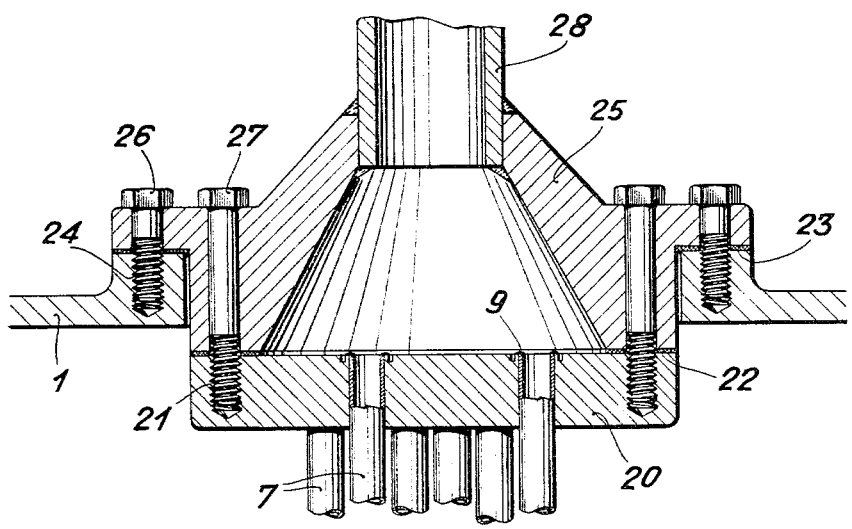
FIG. 4 is a cross-sectional view of a modified part of the heat exchanger according to the invention.

In cases where welding can be avoided and conventional packings can be used, the hollow element 11 and the closure member 14 of the modification shown in FIG. 1 are replaced by an element 25 shown in FIG. 4 and having an annular end face facing a peripheral portion of a circular tube plate 20 and separated therefrom by a sealing ring 22. Adjacent to the aperture in the wall of the vessel 1 for receiving the element 25 the wall of the vessel forms an annular surface facing a like annular surface of a flange extending from the element 25. A sealing ring 23 is interposed between the adjacent surfaces of the flange of the element 25 and of the wall of the vessel 1. Threaded bores 21 are provided in the tube plate 20 for receiving the threaded ends of bolts 27 extending through the element 25 for pressing the tube plate against said element. Threaded bores 24 are provided in the portion of the wall of the vessel 1 adjacent to the opening for receiving the element 25. The threaded bores 24 receive the threaded ends of bolts 26 for tightening the flange of the element 25 to the vessel 1. The opposed annular surfaces of the flange of the element 25 and of the wall of the vessel 1 and the opposed annular end surface of the element 25 are placed coaxially. A conduit 28 is connected to the element 25 for supplying or withdrawing fluid to and from the tubes 7.

After removing the bolts 26 and 27 the element 25 can be pulled out of the vessel 1 and the sealing rings 22 and 23 can be replaced. At the same time, the weld connections 9 between the tubes 7 and the tube plate 20 can be inspected and, if necessary, repaired.

I claim:
1. A heat exchanger for transferring heat from a heating fluid to a second fluid, comprising:
   a cylindrical vessel having a cylindrical wall having two end portions,
   a closure plate at each end of said vessel,
   an aperture in each of said plates, one of said apertures forming an inlet and the second aperture forming an outlet for the heating fluid,
   a plurality of tubes placed in said vessel for conducting the second fluid,
   a hollow connecting element at each end portion of said cylindrical wall,
   each of said connecting elements having a part extending through said cylindrical wall into said vessel and being tightly connected to said cylindrical wall,
   separate tube sheets placed inside said vessel and facing and being spaced from the inside wall of said vessel, said tube sheets being connected to and closing said part of said connecting elements inside said vessel, each of said tubes having a first end tightly connected to one of said tube sheets and having a second end tightly connected to the second tube sheet for communicating said tubes and the interiors of said hollow elements,
   said tube sheets being parallel with the longitudinal axis of said vessel and forming with said tubes a tube bundle substantially filling said casing, said tube sheets being capable of being inserted into and removed from said cylindrical vessel as a unit with the tubes attached thereto in the direction of the longitudinal axis of said vessel,
   each of said elements having a closed portion outside of said vessel, and
   a conduit connected to each of said closed portions for conducting the fluid passing through said tubes.

2. A heat exchanger as defined in claim 1 wherein the part of said element extending into said vessel is circular and has an annular end face, said tube plate is circular and has a peripheral portion facing and adjacent to said end face, said element is provided with a flange having an annular surface coaxial of said end face, said vessel has an annular surface conformed and adjacent to the annular surface of said flange, and means are provided for pressing said tube plate against said end face and for pressing said annular surface of said flange against said annular surface of said vessel.

3. A heat exchanger as defined in claim 1 wherein said tube sheets are circular and said parts of said elements extending into said vessel are cylindrical and individually surround said tube sheets and are welded onto said tube sheets.

4. A heat exchanger for transferring heat from one fluid to a second fluid, comprising:
   a cylindrical vessel for conducting one of said fluids,
   a tube system for conducting the second fluid, said tube system comprising a plurality of tubes arranged in parallel relation with respect to the flow of the second fluid therethrough, each of said tubes having an inlet end and an outlet end,
   a first circular tube sheet receiving the inlet ends of said tubes, a second circular tube sheet receiving the outlet ends of said tubes, the central axes of said tube sheets being normal to the longitudinal axis of said cylindrical vessel and said tube sheets facing the inside of said cylindrical vessel and being spaced therefrom,
   said tubes and tube sheets forming a unit capable of being inserted into said cylindrical vessel in the direction of the longitudinal axis of said vessel,
   each of said tube sheets having a threaded circumferential surface,
   a circular aperture in said vessel opposite each of said tube sheets,
   a hollow cylindrical element extending through each of said apertures into said vessel, each element having an internally threaded end portion placed inside said vessel and screwed onto one of said tube sheets inside said vessel,
   a conduit connected to one of said elements for supplying the second fluid to said tube system, and a conduit connected to the second of said elements for releasing the second fluid from said tube system.

References Cited by the Examiner

UNITED STATES PATENTS

| 1,071,570 | 8/1913 | Patterson | 165—163 |
|---|---|---|---|
| 1,685,453 | 9/1928 | Johanson | 165—74 |
| 1,926,494 | 9/1933 | Morterud | 165—157 |
| 2,869,830 | 1/1959 | Cox | 165—157 |
| 2,888,251 | 5/1959 | Dalin | 165—74 |
| 2,907,644 | 10/1959 | Cunningham et al. | 165—145 |
| 2,995,343 | 8/1961 | Garner et al. | 165—142 X |

FOREIGN PATENTS

| 75,473 | 6/1894 | Germany. |
|---|---|---|
| 823,904 | 11/1959 | Great Britain. |

ROBERT A. O'LEARY, *Primary Examiner.*

FREDERICK L. MATTESON, JR., KENNETH W. SPRAGUE, CHARLES SUKALO, PERCY L. PATRICK, *Examiners.*